United States Patent Office 3,590,025
Patented June 29, 1971

---

3,590,025
POLYMERISATION OF FLUORINE-CONTAINING OLEFINS
Barry Tittle, Runcorn, England, assignor to Imperial Chemical Industries Limited, London, England
No Drawing. Filed July 8, 1968, Ser. No. 743,011
Claims priority, application Great Britain, July 12, 1967, 32,136/67
Int. Cl. C08f 3/24
U.S. Cl. 260—92.1    4 Claims

ABSTRACT OF THE DISCLOSURE

Polymerisation of tetrafluoroethylene to solid polymers having melting points above 300° C., and differing from known polytetrafluoroethylene in their behaviour at temperatures of this order, by means of a catalyst system comprising antimony pentafluoride and a non-aqueous solvent at moderate temperatures and pressures, particularly 0°–50° C. and autogenous pressures. Examples of solvents are liquid sulphur dioxide, trifluoroacetic acid, fluorosulphonic acid and tetrafluoroethylene tetramer. The solvent appears to have some influence on the properties of the polymer. Reaction times are in the region of 30 minutes to two hours and inorganic catalyst residues are washed out of the polymers and the latter conveniently purified by heating with nitric acid.

---

This invention relates to polymers derived from fluorine-containing olefin monomers and to novel catalyst systems for bringing about the polymerisation of the latter.

In one particular form the invention provides a process for polymerising terminally unsaturated perfluoroolefins, for example tetrafluoroethylene, at moderate temperatures and under moderate pressures by contacting the perfluoroolefin with a catalyst system comprising antimony pentafluoride and a second component.

By moderate temperatures is meant temperatures within the range 0° C. to 50° C., particularly 10° C. to 30° C., and by moderate pressures is meant pressures from atmospheric pressure to the autogenous pressure developed when the polymerisation takes a place in a closed vessel. Higher temperatures and pressures can if desired be employed, for example up to 250° C. and 300 atmospheres respectively.

The second component of the catalyst system can be regarded partly as a solvent or reaction medium, but it also can influence the type of polymer formed and thus may function as a co-catalyst with the antimony pentafluoride. Examples of second components are liquid sulphur dioxide, anhydrous trifluoroacetic acid, fluorosulphonic acid, oligomers of tetrafluoroethylene, for example the tetramer $(C_2F_4)_4$; fluorides and oxyfluorides of phosphorus and of sulphur, carbonyl fluoride; tetrafluorides of silicon, titanium, germanium and of zirconium, and of sulphur, selenium and tellurium; hexafluorides of tellurium and of uranium; and other fluorides, for example of vanadium.

That the second component can play a part in the polymerisation may be shown by comparing the types of polymer obtained from tetrafluoroethylene and different catalyst systems. For example the combination of antimony pentafluoride and liquid sulphur dioxide gives a finely divided white powder, which melts at 330° C. to a clear liquid unlike known polytetrafluoroethylene which normally does not melt but undergoes a transition from a crystalline to an amorphous state at about 327° C. The combination of antimony pentafluoride and the tetramer of tetrafluoroethylene gives a flaky polymer of tetrafluoroethylene which does not melt at temperatures up to 350° C.

The polymerisation of tetrafluoroethylene by means of the antimony pentafluoride/second component system proceeds rapidly at ambient temperatures, for example from 10° C. to 30° C., and is conveniently carried out in an autoclave. After reaction times of the order of ½ to 2 hours inorganic catalyst residues can be washed out of the solid polymers and the latter purified further by refluxing with nitric acid and subsequently filtering from the liquid phase.

EXAMPLE 1

Fluorosulphonic acid $HSO_3F$ (60 mls.) and antimony pentafluoride (16 g.) were charged into a 300 mls. stirred autoclave, after which tetrafluoroethylene was introduced from a cylinder containing the liquid monomer stabilised with α-pinene. Absorption of tetrafluoroethylene began at once at room temperature and continued for about 30 minutes. After absorption was complete the contents of the autoclave were found to be solid since the fluorosulphonic acid had been taken up by the finely divided product. The latter was washed with water and then refluxed with nitric acid to yield 20 g. of a finely divided solid white polytetrafluoroethylene.

EXAMPLE 2

Liquid sulphur dioxide (60 mls.) and antimony pentafluoride (18 g.) were charged into a 300 mls. stirred autoclave and tetrafluoroethylene then introduced at room temperature from a cylinder. Rapid absorption of tetrafluoroethylene took place in an exothermic reaction which was completed in 30 minutes. The gaseous contents of the autoclave were then vented to atmosphere and 46 g. of a finely divided solid white polytetrafluoroethylene was recovered. This polymer melted at 330° C. to a clear colourless liquid.

EXAMPLE 3

Tetrafluoroethylene tetramer, $(C_2F_4)_4$, (60 mls.) and antimony pentafluoride (15 g.) were charged into a 300 mls. stirred autoclave, and tetrafluoroethylene introduced at room temperature from a cylinder. The rapid reaction was complete after 30 minutes and 10 g. of a white flaky polymer was obtained which did not melt at temperatures up to 350° C.

EXAMPLE 4

Anhydrous trifluoroacetic acid (60 mls.) and antimony pentafluoride (15 g.) were charged into a 300 mls. stirred autoclave and tetrafluoroethylene introduced at room temperature. Rapid absorption took place and the reaction was complete after 30 minutes to yield 25 g. of polytetrafluoroethylene.

What we claim is:
1. A process for making solid polymers of tetrafluoroethylene comprising contacting tetrafluoroethylene with a catalyst comprising a catalytic amount of antimony pentafluoride and in a liquid reaction medium which is an anhydrous solvent selected from the group consisting of liquid sulphur dioxide, trifluoroacetic acid, fluorosulphonic acid, and oligomers of tetrafluoroethylene at temperatures from 0° C. to 250° C. and under pressures of one to 300 atmospheres.

2. A process as claimed in claim 1 in which the temperature is 0° C. to 50° C. and the pressure is from one atmosphere to the autogenous pressure developed by carrying out the reaction in a closed vessel.

3. A process as claimed in claim 1 in which the solvent is tetrafluoroethylene tetramer $(C_2F_4)_4$.

4. Solid polymers of tetrafluoroethylene when made by the process of claim 1.

References Cited
UNITED STATES PATENTS

| 2,377,297 | 5/1945 | Lamb et al. | 260—82.1 |
| 2,490,764 | 12/1949 | Benning et al. | 260—92.1 |
| 2,734,047 | 2/1956 | Smith et al. | 260—94.8 |
| 2,970,988 | 2/1961 | Lo | 260—92.1 |

HARRY WONG, JR., Primary Examiner

U.S. Cl. X.R.

252—429, 437, 439, 441